(12) United States Patent
Smyth et al.

(10) Patent No.: US 9,239,883 B2
(45) Date of Patent: Jan. 19, 2016

(54) SEARCHING SYSTEM HAVING A SERVER WHICH AUTOMATICALLY GENERATES SEARCH DATA SETS FOR SHARED SEARCHING

(76) Inventors: Barry Smyth, County Wicklow (IE); Maurice Coyle, Dublin (IE); Peter Briggs, Dublin (IE)

( * ) Notice: Subject to any disclaimer, the term of this patent is extended or adjusted under 35 U.S.C. 154(b) by 38 days.

(21) Appl. No.: 13/353,578

(22) Filed: Jan. 19, 2012

(65) Prior Publication Data

US 2012/0143843 A1 Jun. 7, 2012

Related U.S. Application Data

(63) Continuation of application No. 12/458,109, filed on Jun. 30, 2009, now abandoned.

(60) Provisional application No. 61/129,514, filed on Jul. 1, 2008.

(51) Int. Cl.
*G06F 17/30* (2006.01)

(52) U.S. Cl.
CPC ................................ *G06F 17/30867* (2013.01)

(58) Field of Classification Search
USPC ........................................................ 707/707
See application file for complete search history.

(56) References Cited

U.S. PATENT DOCUMENTS

| | | | |
|---|---|---|---|
| 7,756,843 B1 | 7/2010 | Palmer | |
| 2006/0004892 A1* | 1/2006 | Lunt | G06F 17/30864 1/1 |
| 2006/0042483 A1* | 3/2006 | Work | G06Q 10/00 101/91 |
| 2007/0112761 A1* | 5/2007 | Xu | G06F 17/30616 1/1 |
| 2008/0033959 A1 | 2/2008 | Jones | |
| 2008/0141117 A1* | 6/2008 | King | G06F 17/30011 715/238 |
| 2008/0281793 A1 | 11/2008 | Mathur | |
| 2009/0276231 A1 | 11/2009 | Bazigos et al. | |
| 2009/0276233 A1* | 11/2009 | Brimhall | G06Q 40/025 705/38 |
| 2009/0276331 A1 | 11/2009 | Sun et al. | |
| 2009/0281988 A1* | 11/2009 | Yoo | G06F 17/30867 1/1 |
| 2010/0010987 A1 | 1/2010 | Smyth et al. | |
| 2010/0082604 A1 | 4/2010 | Gutt et al. | |
| 2010/0153285 A1 | 6/2010 | Anderson et al. | |
| 2010/0169339 A1 | 7/2010 | Junqueira et al. | |
| 2011/0113100 A1 | 5/2011 | Chawla | |
| 2011/0179025 A1 | 7/2011 | Chuang | |

FOREIGN PATENT DOCUMENTS

WO   WO-2011117737 A1   9/2011

OTHER PUBLICATIONS

"Finalists and Winners of the Competition 2009," dated Jul. 28, 2008, retrieved from the Internet on Jul. 13, 2011: http://entrepreneurship.unica-network.eu/content/finalists-and-winners-competition-2009 (1 page).

"Heystacks Technologies," dated Nov. 9, 2009, retrieved from the Internet on Jul. 13, 2011: http://entrepreneurship.unica-network.eu/sites/default/files/HeyStaks__Abstract__Final/pdf (1 page).

(Continued)

*Primary Examiner* — Shyue Jiunn Hwa

(74) *Attorney, Agent, or Firm* — Choate, Hall & Stewart LLP; Brenda Herschbach Jarrell

(57) ABSTRACT

A system has a primary server storing search data sets ("staks") and a linked social network server.

16 Claims, 9 Drawing Sheets

(56) References Cited

OTHER PUBLICATIONS

International Preliminary Report on Patentability for PCT/IB2011/001021, mailed Oct. 4, 2012 (6 pages).

International Search Report for PCT/IB2011/001021, mailed Jul. 27, 2011 (3 pages).

New Technology to Improve Internet Searching by Stacking and Sharing Information, dated Jul. 28, 2008, retrieved from the Internet on Jul. 13, 2011: http://www.ucd.ie/news/2008/07JUL08/28078_haystacks.html (2 pages).

Smyth, B. et al., "A Case-Based Perspective on Social Web Search," Case-Based Reasoning Research and Development, Spring Berlin Heidelberg, Jul. 20, 2009 (pp. 494-508).

Smyth, B. et al., "Exploiting Query Repetition and Regularity in an Adaptive Community-Based Web Search Engine," User Modeling and User-Adapted Interaction, Kluwer Academic Publishers, vol. 14, No. 5, Jan. 1, 2004 (pp. 383-423).

Smyth, B. et al., "Google Shared. A Case-Study in Social Search," User Modeling, Adaptation and Personalization, Springer Berlin Heidelberg, Jun. 22, 2009 (pp. 283-294).

Written Opinion for PCT/IB2011/001021, mailed Jul. 27, 2011 (6 pages).

* cited by examiner

SEARCHING SYSTEM HAVING A SERVER WHICH AUTOMATICALLY GENERATES SEARCH DATA SETS FOR SHARED SEARCHING

The present application is a continuation application of and claims priority to U.S. Utility application Ser. No. 12/458,109, entitled "Searching System Having a Server which Automatically Generates Search Data Sets for Shared Searching" and filed Jun. 30, 2009, which claims priority to U.S. Provisional Application No. 61/129,514, entitled "Searching System Having a Server which Automatically Generates Search Data Sets for Shared Searching" and filed Jul. 1, 2008, the contents of each which are hereby incorporated by reference in their entirety.

FIELD OF THE INVENTION

The invention relates to information retrieval or searching. It relates especially to wide area network searching such as using the Internet.

PRIOR ART DISCUSSION

Internet searching has become quite efficient due to the manner of distributing storage and retrieval processing across computer resources.

An example of the art in this field is U.S. Pat. No. 7,467,131 (Google, Gharachorloo et al)), which describes methods of handling search queries with use of a cache.

US2008/0133495 (MH2 Technology, Fischer) shows how the results of a search can be weighted and re-ranked according to the sharing activity of users in a social network. In one example (page 4) this document describes how search results might be re-ranked if a given users recent social network activity was travel related; in this case results which matched travel terms could be promoted. The overall approach is to build an individual user profile from the social network activity of a user and use this profile to re-rank search results.

US2008/0189274 (8Lives Technology, Mann) describes a method to help users to find product information. There is a mechanism for generating a multitude of search queries in order to obtain different pieces of information on a product. For example, an initial query over a product database may be supplemented by additional queries to other data sources, including a vendor database and/or social network in order to obtain additional product information. This information is then brought together in the form of a unified product page.

U.S. Pat. No. 6,421,675 (SLI Systems, Ryan et al) describes an approach to searching in which a database is updated with the selections of many different users.

US2006/0173830 (UCD, Smyth et al) describes an approach in which hit matrices are stored, so that a meta search engine can post-process underlying search engine results according to previous query-response selections.

Considering the current art in Internet searching there is room for improvement in certain aspects. For example, if a group of friends are planning a summer vacation and conduct much of their research by using a variety of online resources, once interesting information has been located there is little support provided to help users share this information effectively, with searchers typically using email and conversation as a way to share their "finds". But this is a very inefficient way to share information within the group and such an ad-hoc approach to sharing will inevitably result in missed opportunities and wasted research. Some individuals will find that they frequently want to revisit a page or site that they had previously located, but because they neglected to bookmark it they now have to repeat the search and spend valuable time re-finding the page. Also, searchers may remain ignorant of relevant results located by another searcher. Sometimes searchers will select results that are relevant to the current topic but that will not meet their particular individual requirements or needs at the time. These results are unlikely to be explicitly communicated to or shared with others in the group by the unsatisfied searcher and so may be missed entirely. However, it could be that these unshared results prove to offer good compromises with respect to other users' needs, if they had been communicated.

In another example, a user runs a specialist portal relating to vintage cars, bringing together a rich database of information on this topic, but finds that when users of the portal input the search query "jaguar photos" the search engine returns wildlife-related results ahead of car results.

However, there is a need for improved search processing in order to reduce duplication of search steps and provide both a more effective search experience for the user, and reduce search query and response traffic in networks such as the Internet.

The invention addresses this problem.

SUMMARY

A searching system comprises a search server comprising interfaces for communication with databases or with underlying search engines, wherein the search server is adapted to:
  receive a search query from a client system under instructions from a user; and
  retrieve search results and transmit the results as a response to the client system;
  wherein the search server is adapted to store search data sets of relevant results for queries by users who are member of the set,
  wherein the search server is adapted to select a search data set of which the user for the query is a member, and to use said search data set in providing the response to the query;
  wherein the search server is adapted to download data concerning the selected search data set to the user; and
  wherein the search server is adapted to automatically update the search data set according to the results selected by the user.

In one embodiment, the search server is adapted to automatically generate the search data set according to tagging of results by members of the search data set.

In one embodiment, said tagging includes a vote quantifier applied by a member to a result.

In one embodiment, the search data set includes both Web site and individual Web page results.

In one embodiment, the search server is adapted to apply an identifier to the search data set in response to a user instruction and to associate members with the search data set in response to user instructions.

In one embodiment, the system further comprises a social network server adapted to communicate with the search server and to manage a plurality of search data sets, and the search server is adapted to communicate with the social network server to update and select the search data set.

In one embodiment, the search server is a Web server and is adapted to operate a Web site which allows interaction with the social network server for associating members with the search data sets; and wherein the system is adapted to transmit invitations to users identified in the social network server to become members of search data sets.

In one embodiment, the system is adapted to manage compound search data sets containing related search data sets.

In one embodiment, the server is adapted to download to a client system a software agent having software code and settings allowing access by the client system to the search server, and to
- create a new search data set,
- share search data sets with other users, and
- allow the client system to share individual search data set items directly with other users or with entire communities of which they are a member, and
- provide users with lists of search data sets of which they are currently members.

In one embodiment, the software agent allows the client system to:
- resubmit a query to the search server upon selection of a search data set, and/or
- retrieve a recommendation relevant to a selected search data set, and/or
- automatically identify and select a search data set suitable to a current search by analysis of a current search context, and/or
- output recent search activity and search statistics, and/or
- select a search data set suitable to a search as a query is being entered, with dynamic updating of the selection.

In one embodiment, the software agent allows the client system to:
- under user instructions, enter a search query including a trigger to identify which search data set they would like to search in the context of, re-rank and annotate the results of the response using historical usage information derived from the search data sets, and/or augment the results of the response with additional results taken from a search data set that is identified as being relevant to a current search.

In one embodiment, the software agent allows the client system to:
- process historical information associated with results taken from a search data set as part of evidence-based filters to decide upon a result's relevance to a current search, and/or use reputation information derived from historical actions of search data set members to adjust the ranking of results selected by those members when recommending those results in response to new queries, and/or
- access a tagging function whereby a result can be tagged with a set of keywords and added to a search data set, and/or
- re-use page tags provided by users to augment a response to a query whose terms overlap with tag terms or a result, and/or
- allow users to populate search data sets with data from external sources, for integration with existing set data or to seed new sets.

In one embodiment, the software agent allows the client system to:
- export search data set content in a format that may be imported into external data sources or stored for backup purposes, and/or
- generate a compound search data set that draws upon the content of other search data sets when identifying suitable historical search information to present the end-user with.

In one embodiment, the software agent allows the client system to:
- navigate through the results with results being pre-cached to improve response times, allow the user to tag or share a previewed result, or to open it in a new browser tab, and/or
- configure search settings.

In one embodiment, a user's reputation score is calculated based on the extent to which their search actions within a particular search data set assist other users to locate relevant information.

In one embodiment, the search server is adapted to embed widgets in external Web pages or Web page containers, providing users with access to content.

In one embodiment, the search server is adapted to control a Web site providing each subscribed user with access to pages that provide:
- access to data feeds concerning recent activity in a user's search data sets, and/or tools for filtering recent activity data under a category, and/or
- a set list, showing search data sets that the user is a member of and giving summary information on each, and/or
- a display of a user's search communities; and/or
- search data set recommendation, enabling a user to be recommended sets that they might be interested in joining, and/or
- searching for results that have previously been selected in a search data set by entering queries, and/or
- browsing a search data set of which the user is a member and public search data sets.

In one embodiment, the search server is adapted to enable the user to apply settings on each search data set of which they are a member.

In one embodiment, said settings include extent of access to data concerning other users of a service for the search data sets, and whether searching actions will result in the search data set content being updated.

In one embodiment, the server is adapted to allow an owner of a search data set to set permissions on the search data set at a global, individual, or role-based level, to control whether different searching actions will result in the set content being updated.

In one embodiment, the system comprises an automatic update component adapted to automatically download any update-codes that are available from an appropriate update server, said update codes providing instructions for parsing additional underlying search engines so that search data sets include results that have been selected as part of other search engine result-lists and so that results from search data sets can be inserted as part of other search engine result lists.

In one embodiment, the search server is adapted to download a software agent to the client system to allow a user to benefit from results that have been selected from different search engines, wherein new search engines can be added in update codes, and whereby the user is benefits from results from different search engines without needing to access separate meta search engines

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Overview

Figure 1:
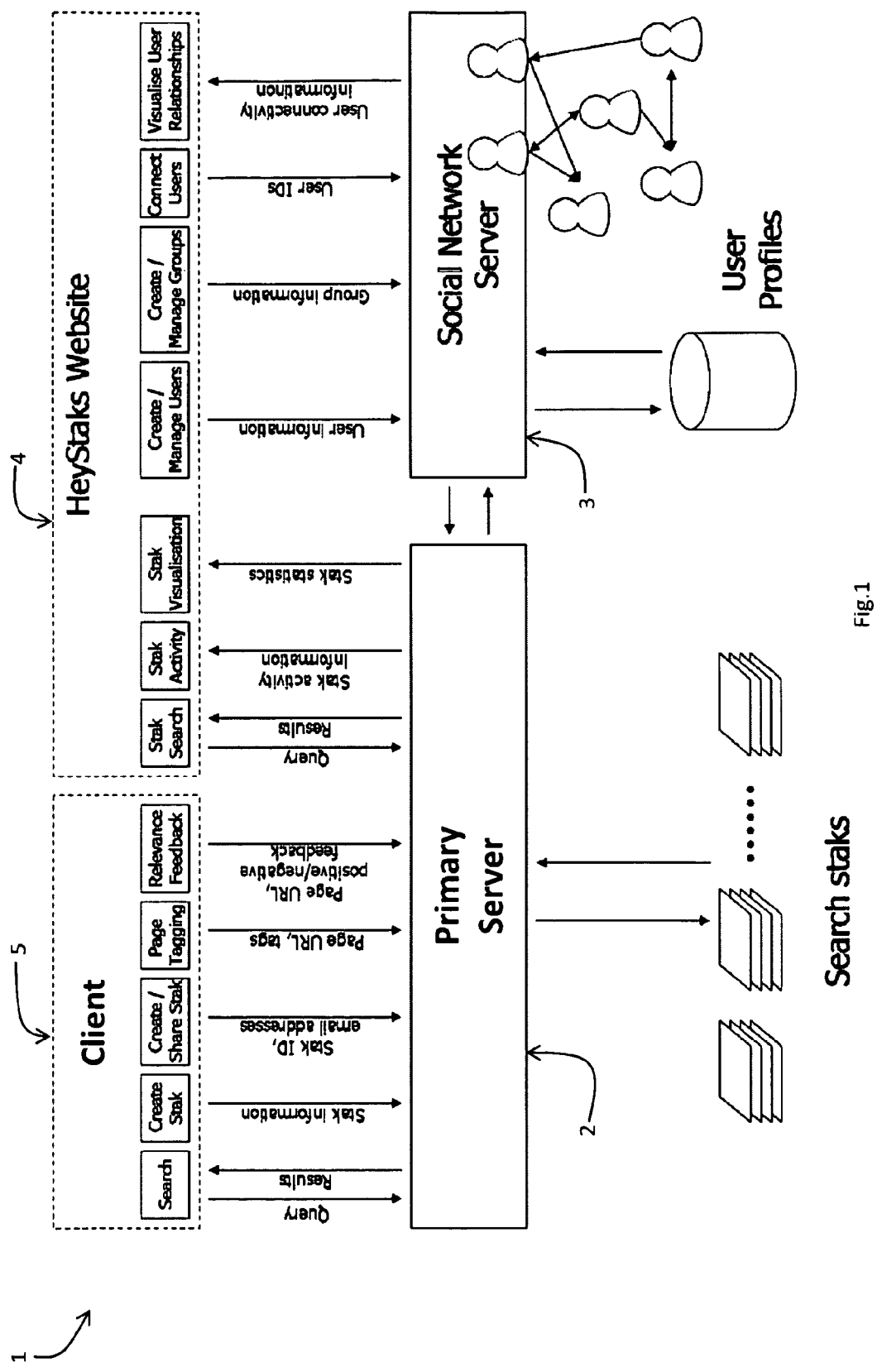
FIG. 1 is a combined block and message sequence diagram illustrating a searching method of the invention.

The invention provides a system and method for database searching which allows individuals and groups of searchers to better organize their searches, easily share their search experiences with others, and instantly benefit from the search experiences of others as they themselves search. In brief, users search in the normal way, using their favourite search engines, but, through the system and method of the invention, have the option of organizing their search knowledge—including but not limited to submitted queries and selected results—into meaningful search data sets (sometimes referred to herein as "staks"). Staks can be easily shared with other users (on an individual basis or by making the stak available for public consumption). By joining a particular search stak a user can benefit from the collective search knowledge of its subscribers during future searches because the invention provides the ability to enhance search results with additional information from relevant staks. For example, results that have been frequently selected for queries similar to the user's current query may be promoted or otherwise highlighted within the default result-list.

The invention allows users to quickly create and share staks and includes a number of advantageous features for automatically detecting relevant staks, promoting and highlighting potentially relevant results, and pre-populating new staks with search data. This functionality is delivered, in one embodiment, via a browser-based software agent so that it is readily available to the user during routine searches and other Web activities. In addition, the system of the invention provides centralized search knowledge access, embodied in one instance in the form of a separate website (the 'HeyStaks site'), which combines a range of social networking features with data, to provide users and groups with access to detailed search history information. For example, through the HeyStaks website users can review their personal search history and explore what their "friends" have been searching for. In addition the HeyStaks website provides users with functionality that allows them to search for relevant staks for them to join based on a given query or set of queries, or on a set of one or more URLs. News feeds of search activity are published, so users may see what searchers in their network are searching for at the present moment.

The invention allows for enhanced searching using the staks, and this may involve post-processing results from underlying search engines, or it may initially or in parallel process the staks. The staks provide the benefit of both additional potentially relevant Web sites and also particular Web pages within sites. This is achieved automatically by the server automatically accessing the staks of which the searcher is a member. The enhanced searching is expected to provide the benefit of reduced Internet traffic because fewer iterations will on average be required.

A system has a primary server storing search data sets ("staks") and a linked social network server. Interaction with the server is via a client and a Web site. There is a software agent code executing on the client. The software agent component provides full integration with underlying search engines so that users can continue to search in the normal way, using their favourite search engines, while benefiting from management of search staks, automatic stak selection, and result promotion. The system allows users to manage their staks and providing a range of social networking style services to help users make contact with other like-minded searchers. In addition, it allows users to search for relevant staks. The software agent component provides browser-based access to allow users to manage and share their searchers direct from their browser, as well as providing the benefits of search promotions as they search normally. The Web site provides a wide range of additional features to users and allows them to monitor their own activity and stak activities in more detail, and includes a wide range of social networking style features based around the sharing of search information. The engine provides back-end functionality needed to drive a search service including: the management, storage and indexing of stak information; the generation of search promotions; user management; stak search and recommendations.

System Architecture

Referring to FIG. 1, the major components of a system 1 of the invention are a primary server 2 storing search staks and a linked social network server 3. The servers 2 and 3 together are referred to as an engine. Interaction with the server is via a client 5 and a Website 4 hosted by the server 2. There is a "HeyStaks" software agent executing on the client 5, and this and the Website 4 are controlled by the engine 1, 2. Briefly, the software agent provides full integration with underlying search engines (not shown) so that users can continue to search in the normal way, using their favourite search engines, while still benefiting from system functionality (management of search staks, automatic stak selection, result promotion). The Website 4 provides users with a range of additional features, allowing users to manage their staks and providing a range of social networking style services to help users make contact with other like-minded searchers. In addition the Website 4 provides a mechanism that allows users to search for relevant staks and discover new content.

The client software agent component provides browser-based access to the core engine features and allows users to manage and share their searches and staks direct from their browser, as well as providing the benefits of search promotions as they search normally. The Website 4 provides a wide range of additional features to users and allows them to monitor their own activity and stak activities in more detail, and includes a wide range of social networking style features based around the sharing of search information. The engine 2, 3 provides back-end functionality needed to drive a search service including: the management, storage and indexing of stak information; the generation of search promotions; user management; stak search and recommendations.

Search Data Sets

The system of the invention makes Web search a more social experience by the manner in which it allows users to share the fruits of their search labours with others, and to benefit themselves from the search experiences of like-minded searchers. The search data sets which are generated and managed are referred to as "staks", and the following are some examples.

'Tall' Stak (Limited Membership and Activity Timeframe)

A typical search stak is created by a user to share amongst a small group of people, probably friends or colleagues. These staks are likely to reflect a particular set of search interests, probably around a particular project or task.

In one example of use of the system 1 better communication, collaboration and sharing among searchers is achieved by creating a stak to serve as a repository for search experiences related to the planning of the group's vacation. As such one group member will create a "Vacation 2008" stak and will share this stak with other users. When searching for information related to their vacation, the "Vacation 2008" stak is selected either explicitly by the user or automatically by the server 2 (using techniques which will be described below) as the current search context, and any results they select will be stored in this stak. Importantly, these results will be available for other group members to see and as other group members search for similar queries, relevant stak results will be actively promoted within their default search result-lists. The user who wishes to re-find a result they had previously seen simply has to submit a query that is similar to the one they used previously and the engine 2, 3 will promote any results that they had previously selected for this and similar queries. Likewise, other group members will benefit from result promotions that are derived from the searches of others within the group.

Each search that is carried out by a group member adds new search knowledge to the stak. And as stak knowledge grows the system will be able to automatically detect when a user is likely to be searching under a specific stak even if the user has not specified an active stak beforehand. For example, if a user searches for "Yosemite cabins" then the engine 2, 3 is likely to predict "Vacation 2008" as the active stak, on the basis that there have been many recent queries by this stak's members with terms such as "Yosemite" and "cabins", and will set the active stak accordingly. While query terms are used in this illustrative example, in practice many "markers" may be used to identify a particular stak as being relevant. Session-specific data such as other queries submitted prior to a search and results selected, along with their accompanying title and snippets texts may be used, along with stak-specific metrics such as the number of subscribers, traffic levels and volume of search knowledge may also be used.

The "Vacation 2008" stak is clearly limited in scope to a relatively small number of users—in this case a group of friends planning a vacation—and many staks are likely to share this characteristic. Similarly, many staks are likely to be relevant to a particular period of time. The "Vacation 2008" stak is clearly relevant in the run-up to the group vacation and will probably become distinctly less active afterwards. Similarly a stak created by a group of students working on a joint project will remain active for the duration of the project. There may be life in even these short-lived staks long after their creation-event has passed. For example, one could imagine how other users, beyond our initial group of vacation-planning friends, might benefit from the "vacation 2008" stak as they plan a similar vacation during 2009. And so, the system 1 can provide a useful service in making such staks accessible and searchable, for other users to use in the future. Indeed, as we shall see, it is possible for other users to create new staks of their own that link to pre-existing staks with a view to taking advantage of the knowledge that is already available in these staks.

'Grande' Stak (Large Membership)

Another type of stak, which we call a "grande stak", will appeal to significantly larger user bases, and while standard "tall staks" may well remain private, "grande staks" are likely to be promoted more publicly as a general source of expert search knowledge.

In one example Bob has created a new search stak called "Bobs Cars" and he has seeded the stak with a comprehensive set of pages and queries, imported from his own online bookmarks. Having shared this stak with his mailing-list (approximately 1000 users) he is very happy to see a rapid improvement in the ability of his users to find relevant and interesting results. Moreover, the search contributions of his large user-base add vital new information to the stak, further helping users in the future. In addition, as Bob incorporates information about recent and popular searches into his site's homepage and overall content structure, the stak itself starts to serve as a form of content for his site. Moreover, Bob finds that many of his users start to create their own staks, some of which offer more specialized search services. In these cases many users create their staks to link directly to "Bobs Cars" so that promotions from "Bobs Cars" can now appear in staks such as "Vintage Jags" and "The UK Vintage Car Club", thus extending the reach of Bobs-Cars.com and leading to new users as searchers recognize the value of the promotions they received from "Bobs Cars".

'Venti' Stak

Another scenario is that certain staks, such as those maintained by particularly influential bloggers or websites, will gain very large audiences. Say, for example, that TechScrunch.com is one of the leading blogs on subjects related to technology in general and has attracted a loyal following of more than 1 million readers, who routinely check the site for the latest news on technology related matters. When this site set up their "Tech Scrunch" stak and made it available to their readership, the stak quickly grew to be one of the leading repositories of technology related search knowledge available. The stak now has more than 500,000 active members and stak knowledge is growing at a rate in excess of 50 million searches per month. Moreover, the "Tech Scrunch" stak has been linked to by more than 10,000 smaller so-called compound staks, helping an additional 100,000 regular searchers to locate relevant and interesting technology related information every day. Today this stak generates considerable advertising revenue for its creators.

System 1 Components

Behaviour-Driven Dynamic Search Interface Executing on the Client 5.

Using the client 5 the user experience during search is transformed from a static interaction in the classic request-response format into a more dynamic activity. That is, the response retrieved from a search engine when a user query is submitted is augmented using search knowledge collected from the community of searchers so that results that better reflect the community's overall interest profile are highlighted or promoted.

Stak Creation Component Executing on the Primary Server 2.

This component provides an ability for users to create search staks to serve as repositories of search experiences. Each stak stores previous searches, the queries that were submitted and the results that were selected. Search staks allow users to organize their searches along thematic lines in a way that is similar to the manner in which we use folders to store our files.

Stak Sharing Component Executing on the Primary Server 2.

The ability for users to share their search staks with other users, and for other users to join or subscribe to existing staks. In the case of private staks, the stak creator must explicitly invite individuals to join a particular stak.

Automatic Stak Selection Component Executing on the Primary Server 2.

Users who have joined or subscribed to a stak are known as the stak members and there is a mechanism for stak members to benefit from the search information that has been stored in a stak or group of staks. There is a three-stage promotion mechanism encompassing stak selection, candidate selection, and result promotion. With respect to stak selection, when a user submits a new query to a search engine, the server 2 identifies which stak is most appropriate to this query; that is, which stak is likely to be the best source of search knowledge with which to answer this query. For example, if our vacation planning user submits a query for "Yosemite cabins"

to Google, then, assuming there is evidence of similar queries from the "Vacation 2008" stak members in the past, this stak will be automatically selected as a context to this new search. It should be noted that while query terms are used as one method for determining stak suitability, additional factors may also be used, including but not limited to the results selected in the staks along with their accompanying title and snippet text, stak membership numbers, stak activity levels in terms of volume and recency, etc.

Candidate Selection Component Executing on the Server 2.

Once a suitable stak has been identified, the user's current query is used to identify previous results that have been recorded by the stak as potential promotion candidates (such result candidates may have been selected by stak members for similar queries in the past, for example, though other evidence "markers" are possible), which can be ranked according to how frequently they have been selected and how similar their past queries have been. In this way, results that have previously been selected, for queries like "Yosemite cabins" by members of the "Vacation 2008" stak will be selected as potential promotion candidates that should be brought to the attention of the current searcher.

Result Promotion Component Executing on the Server 2.

Finally, candidate promotions must be integrated with the so-called organic results that are returned from the underlying search engine so that, for example, stak results that are part of the organic results may be highlighted as previous stak selections, or stak results which are not part of the organic result-lists may be listed separately as additional recommendations.

Multi-Stak Recommendations Component Executing on the Server 2.

Sometimes the server 2 will identify relevant results as promotion candidates not just from a single stak, but from multiple staks. For example, a user may subscribe to a plurality of related staks, each addressing a different aspect of some area of interest. In this case, for a given query, a user may have multiple relevant staks. For instance, if a vacation planning user also subscribes to a more general "World Travel" stak and perhaps a "California Wilderness" stak, then it is certainly possible that a query for "Yosemite cabins" may well throw up promotion candidates from these two staks (by dint of their members' searches) as well as their own "Vacation 2008" stak. In this case, the organic result-list can be enhanced with promotions from multiple staks.

Exploratory Search Component Executing on the Server 2.

By revealing the context of promoted results (for example in terms of the relevant stak name, query terms used, popularity of result within a stak) it is possible to provide users with additional information that they may find helpful during their searches. This information helps them to understand how other stak members have found a particular result to be useful, and may help users formulate improved queries or may inspire them to adapt their searches in a particular direction. Moreover, these annotations serve as a set of links that allow the user to locate additional information. For example, by selecting the stak name of a promoted result the user can receive further information about the stak in question, including other related queries and results that may be relevant to their needs. Another kind of exploratory search is facilitated during user browsing behaviour. When a user is examining a webpage, be it a search result or a page arrived at by some other means, the search knowledge repository can be queried for additional information on the page, such as queries which have led to its selection in the past, comments that users have annotated the page with, and links contained on the page that have been followed previously. This information can be presented on the page and links highlighted to enable the user to make informed decisions about what to do and where to go next.

Stak Creation

Newly created staks are of limited benefit initially because it will take time for their members to build up a critical mass of search histories and until this critical mass is achieved promotions will be infrequent and limited in scope. To address this issue the system 2 includes compound staks and stak imports.

Compound Staks.

When a user creates a new stak they will have the option to link this new stak to other pre-existing staks, —these are so-called remote staks—either public staks or private staks of which they are members. The new stak is known as a compound stak. The benefit of this is that during searches within the newly created staks, the server 2 will also look for relevant promotion candidates from any remote staks. In this way members of the newly created staks can benefit from promotions—we call these remote promotions—that are derived from the search histories of other more mature staks (the remote staks). Moreover, this mechanism allows stak creators to quickly assemble comprehensive search knowledge to provide broad coverage of a topic by combining multiple search staks. For instance, a vacation planning user might initially link their "Vacation 2008" stak to other mature staks such as "California Tours" or "Yosemite Adventures" etc. By default, any remote promotions that are made in the context of a compound stak will be labelled by their original source (the remote stak name), although there may be scenarios whereby the original source of the promotion is not given. Similarly, by default we assume that any result selections made while searching in the context of a compound stak are registered with the compound stak only and are not stored as new data for the remote staks, although once again there may be scenarios where the remote staks do benefit from the search histories of their associated compound staks.

Stak Imports.

This allows stak creators to import "bookmark" data directly by treating bookmark tags as search queries and the bookmarked pages themselves as selected results. In this way, either during stak creation or at a later stage, the user has the option to import large amounts of search data from a suitable third-party resource. By default, wrappers parse data for importing. Other imports can be performed provided an association can be made between a set of terms to act as a query and a specific page to act as a search result; indeed, such an association can be obtained through an analysis of the actual content of pages to identify important or distinguishing terms or analysis of the anchor text provided by Web publishers for hyperlinks to a page. In this way, large amounts of pseudo-search data can be instantly imported to provide comprehensive coverage for a particular domain.

Browser Integration Component.

There is full browser integration via the HeyStaks software agent. This software agent provides users with browser-based access to basic functionality (stak creation and management, preferences and user accounts, etc) and also provides a mechanism to integrate seamlessly with an underlying search engine. In this way the default results of the underlying search engine can be enhanced with information such as result promotions etc. While the idea of a browser-based software agent to enhance search results is not new, the richness of the integration offers a level of service that has not been seen heretofore. For example, the combination of HeyStaks software agent integration and automatic stak selection functionality ensures that every user search is automatically associated with a relevant stak, thereby providing always-on context information that can act as a source of promotions or simply as a way to organize search results.

Instant Stak Sharing Component.

Once a stak has been created it can be shared directly with other users by selecting the sharing option from the software agent and providing a list of usernames and/or email addresses. These target users will receive an invitational email, which, if they accept, will cause the new stak to appear automatically in the stak list of their software agent (if they do not have the HeyStaks software agent installed they will first have to install it). These users will then start to benefit as members of their newly shared stak direct from their browser, every time they search.

Social Search Website 4.

The website 4 complements the HeyStaks software agent by providing Web-based access to a range of additional functionality. The website delivers a familiar social networking style experience to users but, uniquely, it is a social network that is based around search activities. Users are provided with access to their own accounts via a personal homepage that summarises the search staks they have created or that they are members of, along with information about recent activities within these staks (recent and popular queries and results, active users etc). In addition, users can gain access to a more detailed view of any particular stak which they have rights to access (public versus private, by-invitation) in order to explore a detailed record of member activity. The website provides access to an alternative type of search: instead of allowing users to search for result pages in the normal way, the search facility allows them to search for relevant staks based on the queries or results that are popular within these staks. In this way, by entering a simple query, a user will receive a result page that provides a ranked list of relevant staks, complete with their titles, owners, membership information, activity information, recent and popular queries etc. Further utility is created by providing visualizations of search networks and search activity, providing at-a-glance access to information about searchers who have overlapping search interests with the current user and semantic links between queries via overlapping result-lists that may have gone unnoticed.

Search Knowledge Administration/Explicit Feedback Component.

A key issue that must be considered when employing a system that uses implicit feedback gleaned from search behaviours (i.e. queries submitted and results selected) is that of noise. Searchers will sometimes select results that do not satisfy their search needs or they may select relevant results but in the context of the wrong stak and when this happens, unless a suitable mechanism is put in place, the search knowledge repository may be polluted with this noisy, irrelevant data. Furthermore, spammers may select their own Web pages for certain queries so that the search engine will highlight or promote these results in future sessions. To combat these issues, the server 2 contains agents which monitor click patterns to detect suspicious activity, and decay functions to ensure the top results do not receive an unfair share of selections. In addition, some control over this important issue is given to the users themselves via explicit feedback and stak administration functions. For any selected result, the HeyStaks software agent can be altered to include controls that allow the user to provide positive or negative explicit feedback for the result, in the form of "thumbs up" and "thumbs down" icons. This feedback is recorded and may be used in future sessions to identify results which may appear relevant based on their selection histories but which lead to non-relevant pages for a query. For stak members, when they visit the website 4, they have control over the contents of the staks for which they are a member. That is, they can remove results for certain queries which they feel to be spurious or noisy, with additional controls provided to stak owners over whether these pages and the users who contributed them are "banned" from the stak in all future searches.

Client 5

Figure 2:
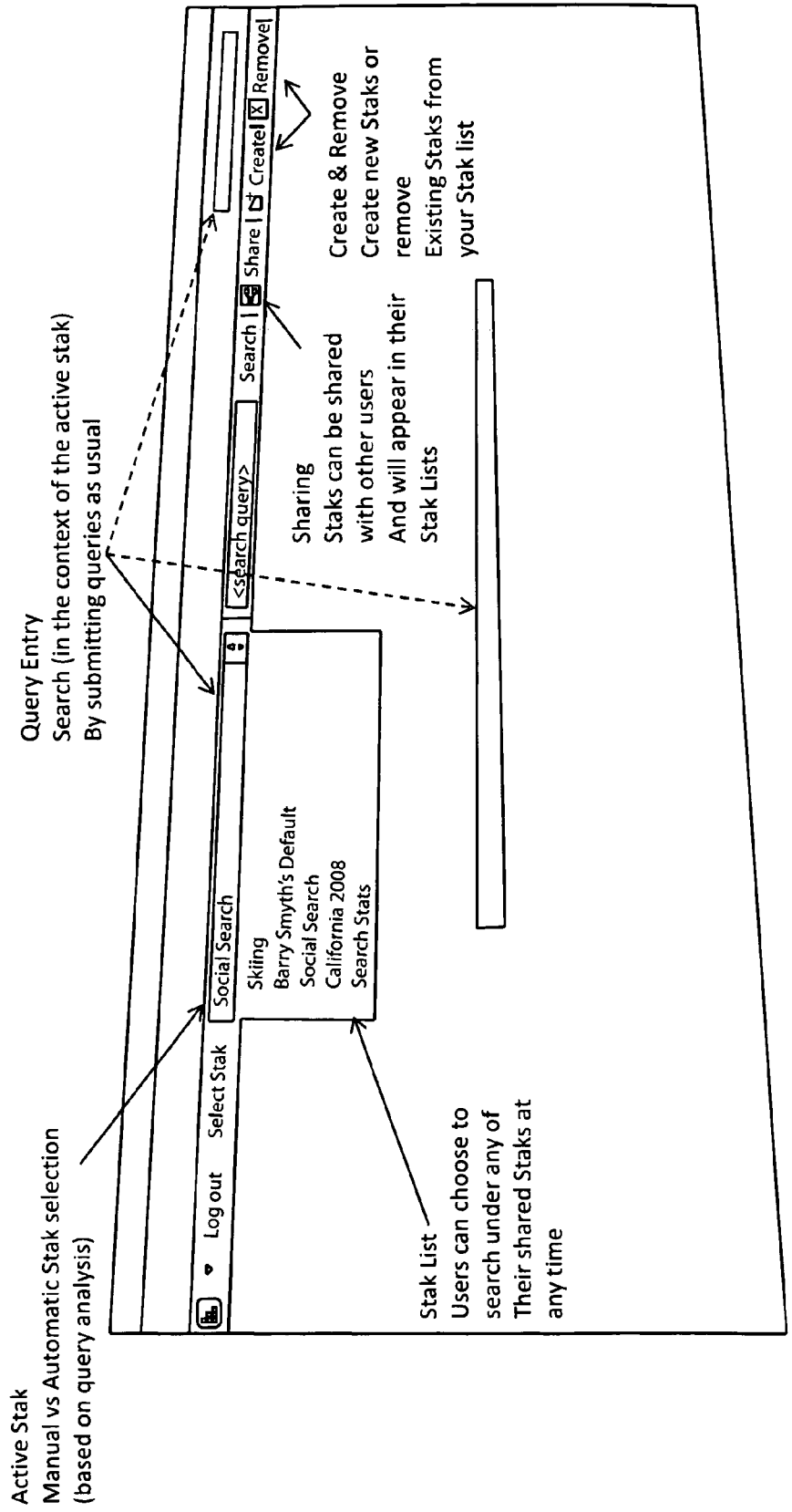
FIGS. 2, 3, and 4 are GUI displays illustrating aspects of the invention.

In one embodiment, the HeyStaks client is implemented as an integrated browser toolbar (see FIG. 2) and is the basis by which the system can be seamlessly integrated with underlying search engines. Other potential embodiments could include a Javascript "bookmarklet", an entirely new Web browser, a standalone application for a desktop computer, an add-on for an existing desktop search tool, a widget which can be embedded in any Web page or a method for delivering targeted search results to a mobile device. Note also that while the store of search knowledge relies on users' interactions with an underlying search service, certain embodiments of the client component of the invention, for example the bookmarklet and widget embodiments, need not be delivered as an add-on to an existing search service. The toolbar provides users with access to a basic range of functions with which to control and configure the system, including:

Log-in/Log-out. Each user must log-in so that the toolbar can communicate. Users are also given the option to store their username and password on their client machine so that they can be logged in automatically.

Preferences. Providing the user with access to a range of preferences including user details, default search engine, search thresholds, auto stak selection settings, and promotion settings.

Stak Creation. Allowing users to quickly create (and populate, via compound staks or and/importing functionality) new staks.

Stak Sharing. Allowing users to rapidly share staks with friends and colleagues.

Active Stak List. Providing users with access, via a drop-down list, to the staks they currently own or subscribe to. Users can manually select any given stak to provide a context for their searches.

Query Box. In one embodiment, the toolbar includes a standard search query box where the user can enter a search query in the usual way and receive a result-list back from their default search engine.

Tagging. The toolbar also provides users with access to a tagging feature whereby the current page (be it a search result or an arbitrary webpage) can be tagged with a set of keywords and added to the current stak. Tagged pages can be promoted in a similar manner to other search results although for practical reasons different promotion settings are used to facilitate fine-tuning. This is a means for augmenting the index of the user's preferred search engine with pages that might not appear in the results returned by the engine for the tag terms or even pages that do not exist in the engine's index at all.

The HeyStaks toolbar provides a range of in-browser functionality allowing users to: select active staks from a list of search staks that the user has either created or subscribed to; share staks with other users; perform stak-enhanced searches; create new staks; delete old staks or unsubscribe from staks.

Search Knowledge Interface

The repository of search knowledge can be utilised for much more than simply altering the result lists returned by a search engine for any particular search. By providing intuitive interfaces to the store of search knowledge, users may access their own search histories and those of their friends, connect with other searchers, examine results that have been selected frequently or recently and in general gain the full benefits of a social searching experience. The current embodiment of such an interface is in the form of a website ('the site') which replicates many of the core software agent functions, but is designed to provide users with a more complete array of stak creation, stak discovery, page discovery and user management features. For example, in addition to allowing users to create, delete and share new search staks, the website 4 also allows users to: search for staks related to their queries; view the profiles of their 'friends' to review the staks that they subscribe to and find useful; receive recommendations of relevant staks based on their staks and recent search histories; edit and manage the staks they own by deleting or moving result selections between staks.

Each user has their own homepage on the website 4 that lets them view and manage their search activity, and to search for other staks that might be useful to them. The user page provides an activity feed that lists the recent search activity in staks that the user is a member of, and the graphs at the bottom of the page provide an additional visual summary of how active these staks are. The user page also lists the other users that this user has connected to via friend invitations, provides recommendations for other staks that the user might be interested in joining, and provides search functionality that enables the user to search for other staks, results, or users.

The Stak page provides a more detailed description of the search activity of the users within a given stak.

The User Page

Figure 3:
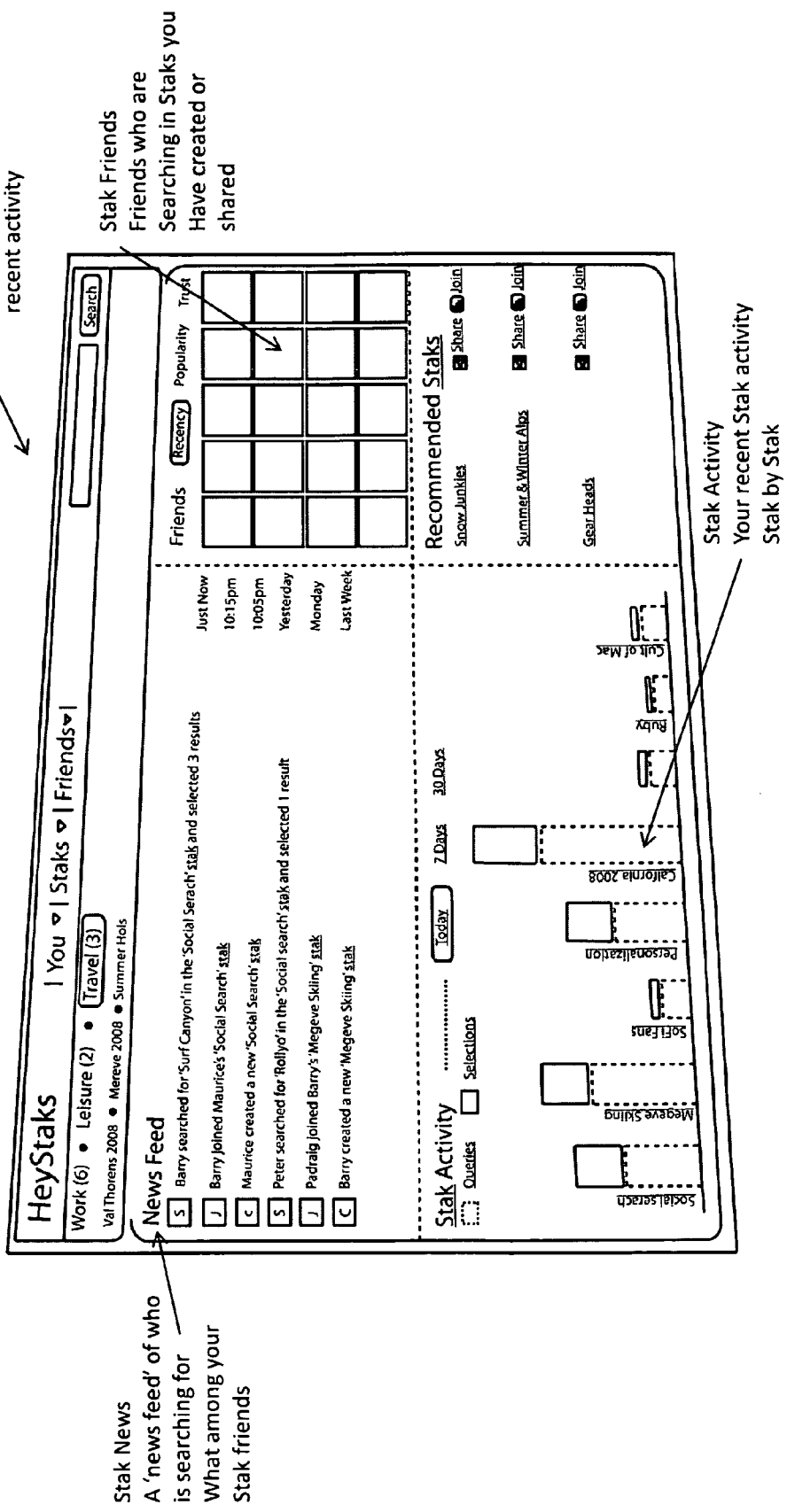

Each user has their own personal homepage (see FIG. 3) on the website 4. This user page provides a means for users to view and manage their activity, to find, join, and create staks, and to connect with other users.

Stak Activity Feed. Shows recent activity in the user's staks. E.g. selected results and the queries used to find them, new stak members, newly tagged pages etc.

Stak List. Shows the staks that the user is a member of and gives summary information on each.

Query Cloud. Shows the most popular query terms across the user's search staks. By selecting terms in the cloud, users are presented with a filtered list of results that were selected for or tagged with those terms within the user's staks.

Friends List. Shows the other users that this user is connected to. Allows the user to view the recent public stak activity of these users, to browse/join public staks that they have created, chat, and leave comments.

Stak recommendation. This feature enables the user to be recommended staks that they might be interested in joining. Suggestions may be based on factors such as commonalities that HeyStaks has discovered between the query, tagging, and result selection behaviour of the user and that of the stak members.

Search. Users can search for results that have previously been selected in their staks by entering queries into the website search box, or by selecting terms from the tag cloud to filter the stak activity.

The Stak Page

Figure 4:
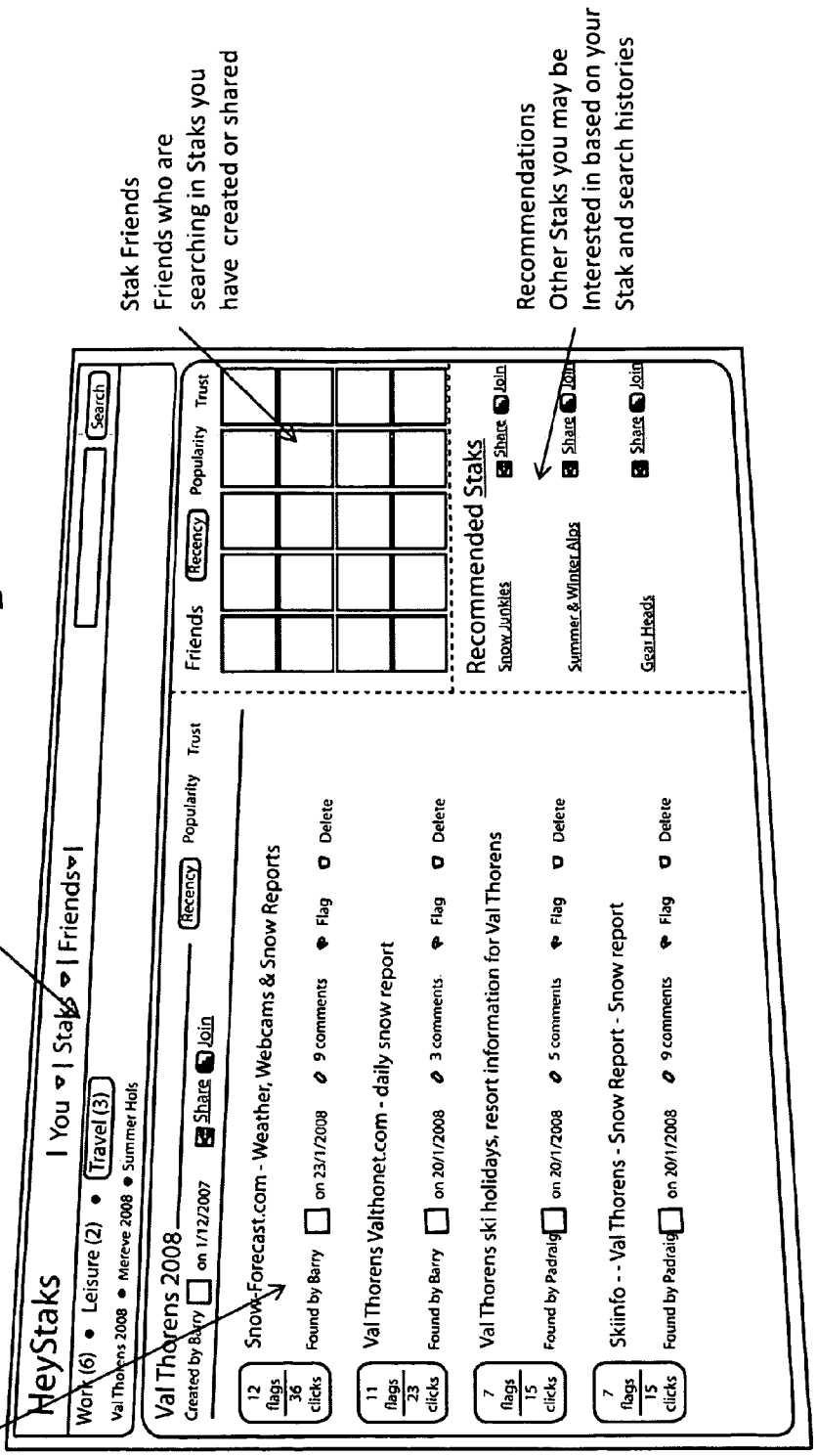

The stak page (see FIG. 4) shows detailed information for a particular stak that the user is a member of.

Stak Activity Feed. Details stak activity ordered by recency or popularity etc.

Query Cloud. Shows the query cloud for the given stak.

Stak Administration. If the user is the owner of the stak, they can manage stak membership and the stak's queries and selected results. For example, they can delete irrelevant queries and results, or can move them to another more suitable stak.

Stak Visualization. Stak activity is summarized using graphs that show the number of queries and result selections per day, the number of stak members etc. Also, the relationships of stak members can be viewed in visual form, showing how the search activity of users overlaps.

The Search Page

On the website 4, users can search for staks, results within staks, or for other users.

Stak Search. Users can search for staks that match their query terms. Matching staks are returned on the basis of matching terms in their titles, description, queries, or tags.

Result Search. Users can search for results within all or a subset of the staks that they have created/joined. Results that have been selected before for queries similar to the target query are returned to the user.

User Search. In addition, users can search for other users that share similar interests based on email address, the queries and tags that they use, the results that they select, and the staks that they are members of.

User Management Component

Each user account is stored as a unique data object—storing data such as the user name, password, screen-name, created staks, shared staks, friends, preferences and thresholds—and can be implemented in the form of a relational database or other suitable data format.

Search Staks

Each search stak (S) is represented as a separate search ("inverted") index in which individual query terms (q) are associated with webpage URLs (p) and an appropriate score (s). Thus $(q,p,s) \in S$ corresponds to to a page p that has been selected by some user of stak S for a query that contains a term q. In this way the search stak index provides efficient lookup, in the future, of any pages that have previously have been selected, in stak S, for a query containing term q.

Figure 5:
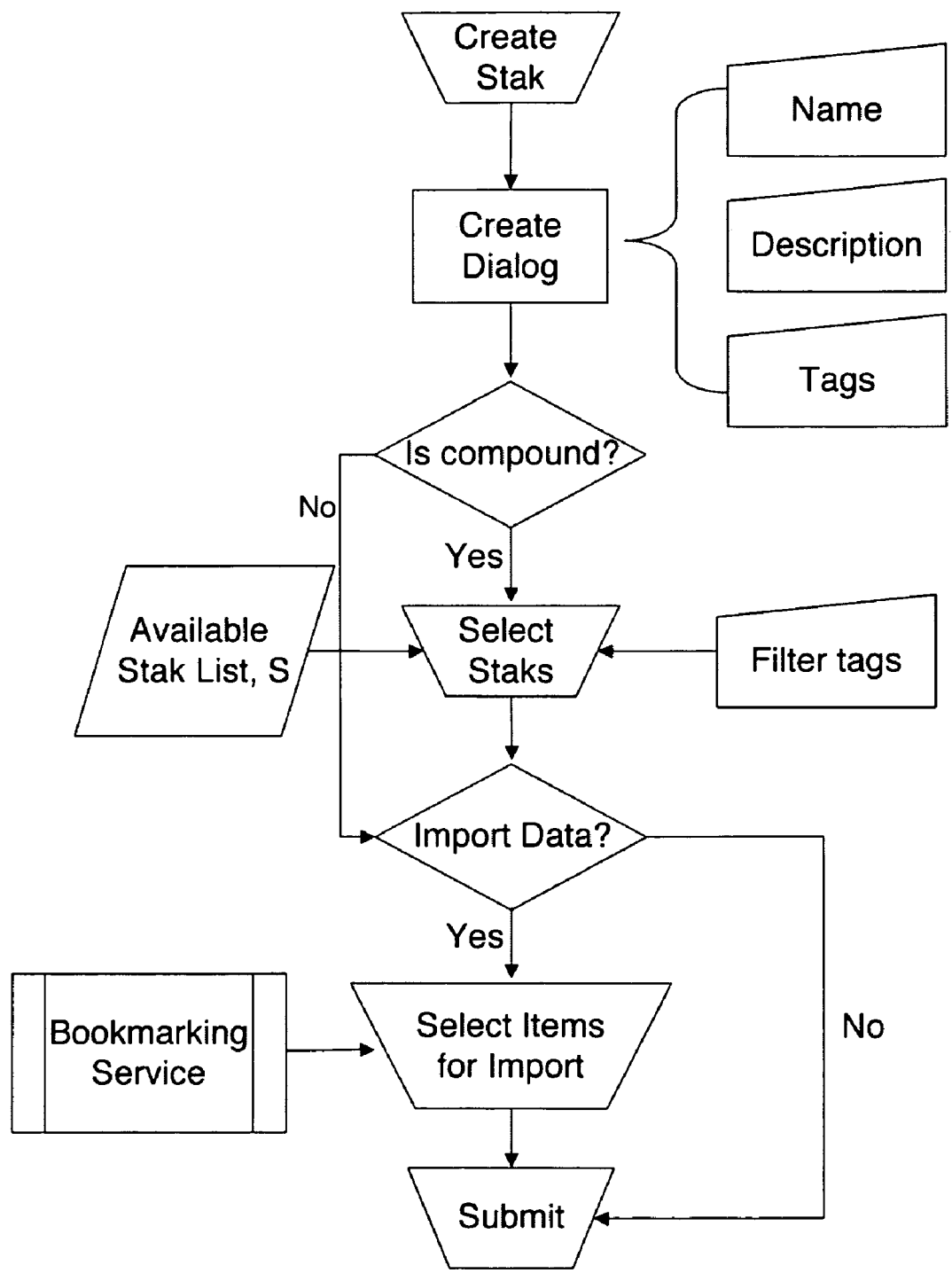
FIGS. 5 to 9 are flow diagrams illustrating the searching method in more detail.

Stak Creation (FIG. 5)

Any registered user can create a new search stak, either directly from the software agent or via the website. The basic stak creation procedure is shown in FIG. 5. Each newly created stak is associated with a stak name, the creator's username, a brief description, and a set of tags to capture the essence of the stak. In combination, the stak name and creator username must be able to uniquely identify each stak.

During stak creation the user can specify the stak to be a compound stak. In this case the new stak is linked with a set of one or more other (non-compound) staks so that future searches within this new stak can benefit from relevant promotions arising out of the linked staks. The Stak creation facility allows the user to identify relevant staks to link to by providing filtering support so that the user can incrementally locate relevant staks by filtering according to tags.

In the stak creation process, the user supplies basic information about the stak such as a description and tags and they may also link to existing staks to form a compound stak and/or import data from an existing source such as an online bookmarking service. Each new stak is registered with the search engine to create a new stak index and the creator can configure various stak parameters. For example, one key parameter is whether the stak is public or private. Any user can join a public stak whereas users can only join a private stak if they receive an explicit sharing notification from the stak creator (see Stak Sharing description above).

Users may also pre-load a newly created stak with search data (in the form of query terms and URLs) during the stak creation process. For example, by default the server 2 is configured to provide import functionality for a bookmarking service, allowing users to import a subset of tags and URLs from their own bookmarks.

Additionally, users may specify a list of URL patterns that will cause matching result URLs in the result-list to always be promoted. Similarly, a second list of URL patterns can be used to prevent matching result URLs from ever being promoted within result-lists.

Figure 6:
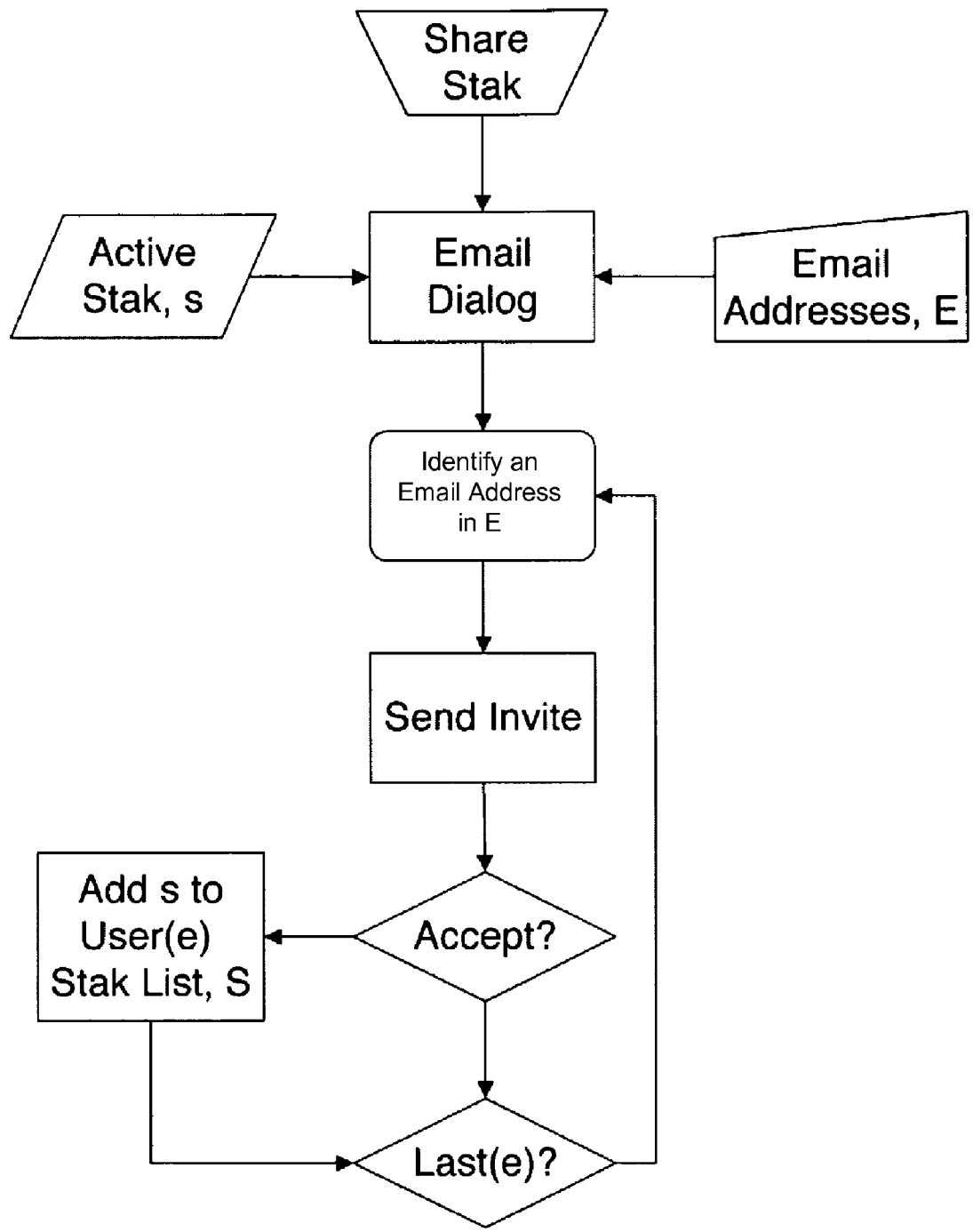

Stak Sharing (FIG. 6)

The sharing of search staks allows individuals to benefit from each other's search expertise. Each stak is associated with a set of users who are members or users of this stak. This list is called the member list of the stak. In turn, each user is associated with a list of the staks that they have joined. This is called the stak list of the user.

In the stak sharing process, the user provides one or more email addresses which results in an invitation to join the active stak being emailed to the recipients. They can then accept the invitation which results in the stak being added to their stak list. Staks can be shared in one of two ways. In the first way, the creator of a stak, S, may share the stak with any number of other users, $u_1, \ldots u_n$, directly from the HeyStaks software agent or through the website. Each selected user will receive a stak invitation (by default email is used, but in theory any form of messaging communication with feedback can be employed) which, if accepted by a recipient, u, will cause the search engine to add u to the list of shared users registered with stak S. In turn, user u's software agent (and the user's account on HeyStaks) will be updated so that its Stak list now contains S. If u is not already a registered user then the stak invitation message will allow them to register as a new user and, upon successful registration will add S to the user's Stak list.

The second way that staks may be shared is for users to simply join a public stak, S; this feature is only available for public staks. Via the HeyStaks website and/or software agent any registered user can join any public stak with a single click, causing the user to be added as a shared user of S in the usual way. The user will then see S as one of their shared staks in their software agent and website stak lists.

Figure 7:
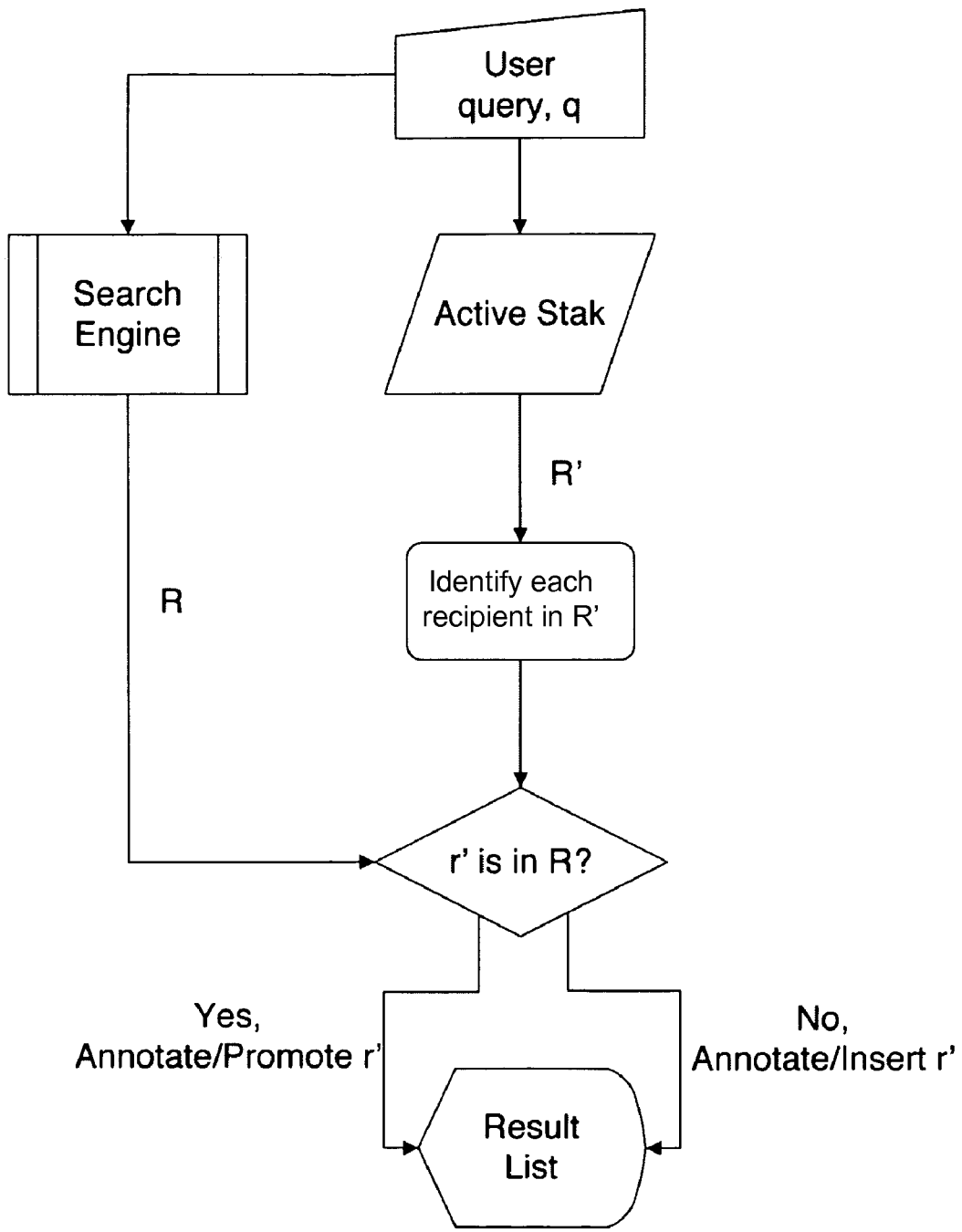
Figure 8:
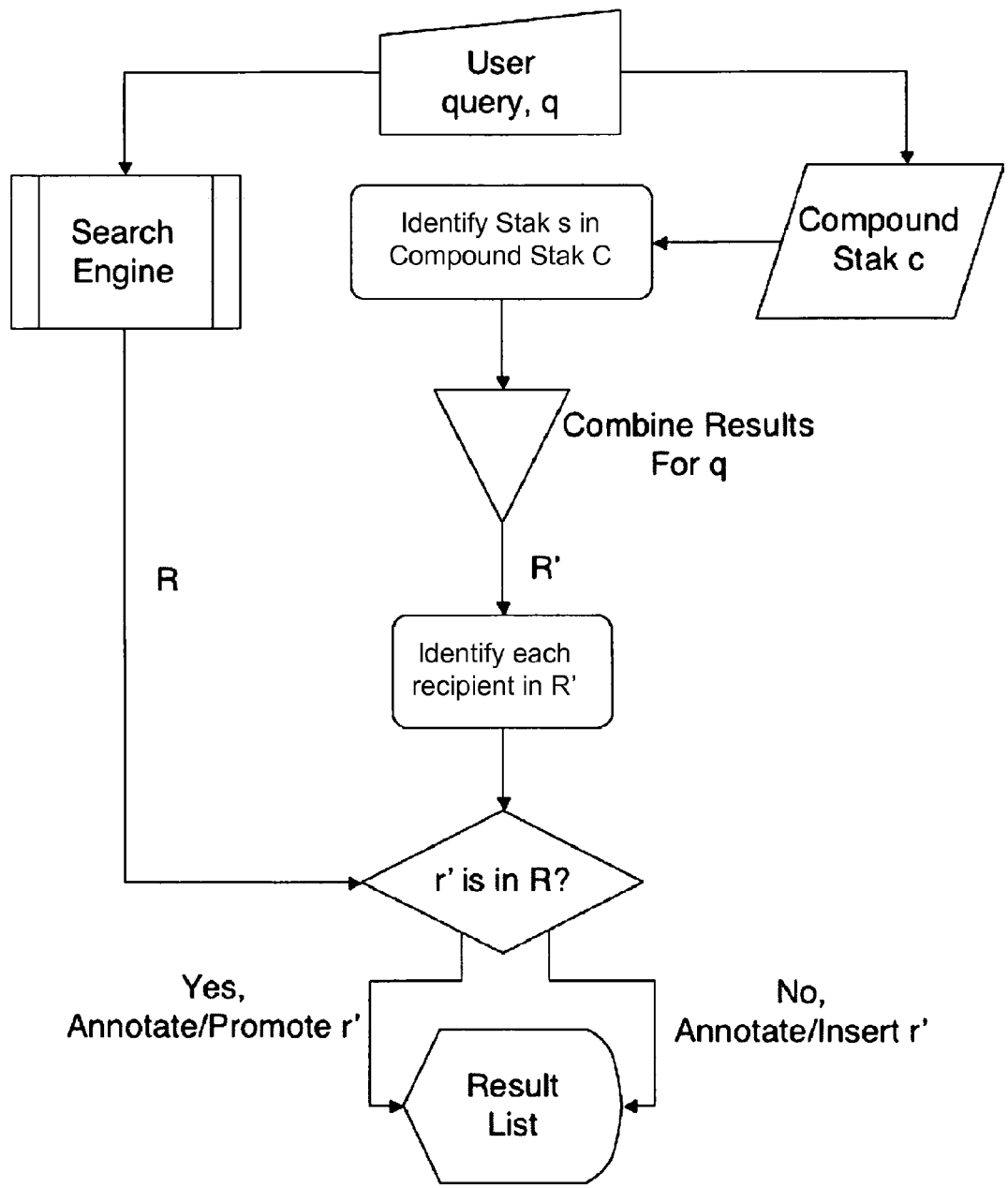
Figure 9:
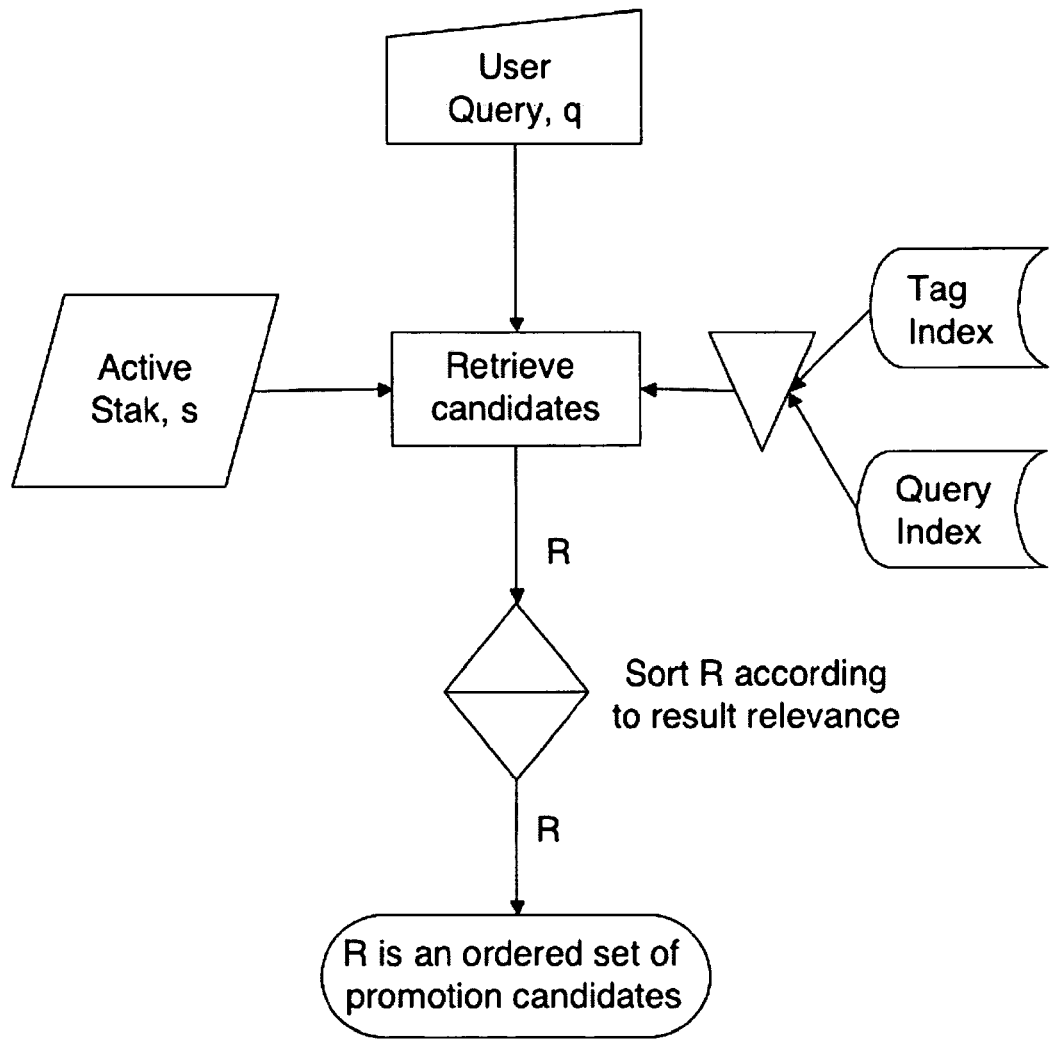

Result Promotion (FIGS. 7-9)

The server 2 has the ability to augment the result-lists returned by a conventional search engine based on the search history of a given stak. When a user selects a particular stak, S, to use as a context for their search (this is referred to as the active stak), the information that is stored in S (the query terms and past result selections/URLs) can be used to enhance the results returned by the search engine used by the searcher.

In a search community interested in classic cars, the query 'jaguar photos' is unlikely to be related to pictures of big cats. By recording and reusing the search knowledge contributed by community members, is able to promote results that are related to the core topics of interest to a community for vague or ambiguous queries.

FIG. 7 shows a process for promoting results for an atomic stak. The stak's index is queried for results, R', relevant to the user's query, q, in parallel to the standard results, R, being retrieved from an underlying search service for q. R is augmented with the results in R' to promote and insert results that have been useful to stak members in the past. This process is known as result recommendation and there are a number of different ways that the server 2 can highlight and suggest recommended results during searches. The basic promotion procedure is presented in FIG. 7 (for staks where only 1 index is queried, i.e. so-called 'atomic' staks) and FIG. 8 (for staks where the indexes for more than 1 stak are queried for each search, i.e. so-called 'compound' staks.

FIG. 8 shows a promotion process for a compound stak, i.e. a stak that draws its search knowledge from one or more underlying atomic staks. In this case, R' is a ranked list of all results that are returned from any of the component staks.

When a user submits a new query, q, to some search engine SE (either via the software agent search box, a browser search box, the standard SE search box or other mechanism) a set of results R are returned. These are the default results from SE and typically account for the top 10 results that SE has deemed to be most relevant to q. In parallel with this, q is submitted to the server 2 along with the id of the user's current stak, S. A complementary set of results, R', are selected by using q to query the search index that corresponds to S. FIG. 9 depicts the process for selecting candidate results from a given stak's index in response to a user query. There are many different ways to implement this process for selecting the results that comprise R'. In one embodiment, the system 1 uses open-source search engine technology to manage the search indices for its staks, with the standard retrieval functionality being used to select and rank and set of results R' for q. For each of the results in R' the system and method of the invention also computes a relevance score to denote its relevance to q in the context of the current stak S. This score can be computed by a variety of different techniques and in one embodiment this is done by combining a number of historical, behaviour-based indicators of relevance with the scoring function that the underlying search and indexing technology applies during its retrieval process.

FIG. 9 shows a list of candidates for promotion are retrieved from a stak, s, for a user query, q, by retrieving all documents that contain 1 or more of q's terms in the query or tag fields using standard, open-source full-text search technology.

At this stage, the system has access to two result sets: the set of results R that have been returned by the SE in response to q; and the set of results R' that are deemed to be relevant to q in the context of the particular active stak S. The system and method of the invention can chose to make one of 3 types of result recommendation as follows.

The first two types of recommendation are known as promoted results. In this case a result r' is a promoted result if it is in both R and R'; in other words the result has been returned by SE and by S. By default these results remain in their default SE result-list positions and are presented to the searcher in the normal way as part of the SE result-list. However, they are also annotated with relevant information from S. This information can include things like: the recency of the selection in S; information about how frequently r' has been selected in S; the query terms that have been used in the past when r' has been selected etc. This additional information serves to highlight the result within the standard SE result-list as one that has special importance in the context of S. It will help the searcher to recognize results that stak members have found to be useful in the past, for example, and the additional query information may help them to better understand the precise context of these past search sessions. This type of promotion is known as in-place promotion.

A second type of recommendation is associated with promoted results that are considered to be relevant enough to merit a positional change. In this case the most relevant results that are present in both R and R' can be boosted so that they are moved from their default result-list position to a higher position in the result-list. By default the server 2 is configured to boost the top 3 most relevant promotions to the top of the result-list. These boosted promotions are annotated with data in the same way as in-place promotions.

A third type of recommendation is known as an insertion: a result r' is an insertion if it is present in R' but it is not in R. In this case, the result has proven to be relevant to users of S in the past and such results can be added as additional recommendations to the default result-list from SE. By default the system and method of the invention includes the top 3 most relevant insertions at the top of the standard SE result-list but many other variations are possible.

It is worth noting that the system 1 provides a further level of control over promotions and insertions by using various types of thresholds with which to judge the relevance of particular result recommendations. For example, an in-place promotion threshold is used to decide whether or not to annotate an SE result r' that is also present in R'. Typically this threshold is based on the relevance score that is computed for r' in the context of S but might also involve some minimum number of past selections (so that results that have been accidentally selected for a few queries might not be promoted) or some time-based data (so that results that have not been recently selected are not promoted).

Similarly, another threshold is used to govern boosted promotions so that results are only boosted in the ranking if there is strong evidence to support their relevance in S. This boosted promotion threshold is typically higher than the in-place promotion threshold to reflect the need for the greater burden of relevance that is needed for boosting.

Finally, an insertion threshold is used to govern whether a particular result r' should be included as an inserted recommendation. Once again, this helps to guard against spurious recommendations that might arise from accidental or malicious result selections by stak members.

These thresholds can be established as system-wide thresholds, they can be set on a stak by stak basis, or they can be set on a user by user basis.

Compound Stak Promotions

During the creation of a stak the system 1 can create a compound stak, which links to one or more non-compound (atomic) staks in order to leverage their recommendations during searches. Recommendations and promotions for compound staks are produced in a manner that is similar to those used for non-compound staks. For a compound stak S which links to a set of non-compound staks $C=\{S_1, \ldots, S_n\}$, the set R' of recommendations from S are based not only on the results that have been indexed under S but also on the results that are indexed in each of the linked staks $S_1, \ldots, S_n$. This provides for an extended set of recommendations, R', which can be integrated into a result-list, along with the results from SE, according to recommendation policies similar to those described above. In the case of recommendations that originate in one of the linked staks, Si, an additional threshold, the compound stack promotion threshold, may be maintained in order to adjust the weighting that is attached to these recommendations.

Stak Update

When searching in the context of a particular active stak, S, any result selections that are made for a query q, are used to update S. This involves updating the search index associated with S, and each result-selection is intercepted by the HeyStaks software agent and returned to the engine 2, 3, including information about the current query, the active stak, the URL of the selected result, the snippet text associated with this result, the time of the selection, and the user id of the user making the selection.

By default the engine 2, 3 updates the Lucene search index using Lucene's standard indexing functions in order to index the selected result URL using a combination of the terms in the query and the terms in the snippet text. Prior to index update the snippet terms are processed to remove stop-words. In addition, the time and user information can also be stored.

In the case of a compound stak, all updates are made with reference to the active stak and updates are not made to the linked staks. While this is straightforward to reconfigure, this default configuration has been chosen to ensure that remote (linked) staks do not become contaminated by the activity of users of another stak.

Stak Selection & the Default Stak

To work effectively in supporting individuals and groups as they search the system 1 associates a new search with an appropriate stak. During the normal course of operation this is the responsibility of the searcher: at search time the searcher can select an active stak directly from the software agent, from the list of staks that they have subscribed to (or created). However, searchers cannot always be relied upon to make this selection, either due to forgetfulness on their part or incomplete knowledge of the contents of the staks to which they subscribe.

In the case where no stak has been selected by the searcher, the system 1 associates search activity with the searcher's so-called default stak. Every user has their own default stak, which can be used as a repository of search information in the case where no other stak has been selected by the user or no suitable stak for a query (which may be isolated from the searcher's common interests) exists. The benefit of this is that at least search information is not lost for the user but a disadvantage is that, unless the user is in the habit of pre-selecting an appropriate active stak prior to every new search (or at least every new search session), the default stak can quickly become 'contaminated' with search information that would be more correctly filed with respect to more specialized staks.

An advantage of the default stak is that at search time the promotion mechanism is configured so as to promote results from all staks that are relevant to a query submitted to the default stak. Normally when a user searches under some (non-default) stak S, then they will only receive promotions and recommendations from S; if a similar query has been submitted under another subscribed stak S', and even if there are promotions available in S' that are relevant to the current query, these promotions will not be made in the context of S. Of course this type of decision is configurable within the system 1 and, for example, it is possible to allow promotions from other staks to be made if such behaviour is merited in the future. It is also possible to provide these promotion candidates from other staks to be recommended but not explicitly promoted/labelled, for example in an expandable area of the results page. Default promotions are usually limited to the currently active stak. The exception to this rule is the default stak which can receive promotions from other staks, assuming the usual promotion thresholds and controls have been triggered.

Returning to the issue of stak selection at search time; by relying on users to manually pre-select an appropriate active stak to form a context for their search, there is high likelihood that many users will simply forget to perform this selection task, thus limiting the long-term benefits that the system 1 has to offer. In an extreme case users may find that, despite subscribing to a number of niche staks, effectively all of their searches are taking place as part of the default stak, simply because they do not tend to (or remember to) pre-select a more appropriate active stak at search time.

When a user enters a search query q, if auto stak selection is active (which it is by default, although it can be configured by a system administrator or user) then this query is compared to each of the staks that the searcher subscribes to (except the default stak) with a view to identifying and selecting an active stak s that is relevant to q. The basis for this is a comparison of the terms contained in q and the terms stored as part of each stak index. A variety of scoring functions can be used based on, but not limited to, such metrics as term popularity/frequency, TF-IDF scores, etc to generate a ranked-list of staks that are relevant to the current query. The choice of final stak can then be made by selecting the highest ranking stak or perhaps by also considering factors such as the recency and/or frequency of stak usage. In this way the system 1 can automatically select a relevant active stak s based on a query q so that the user's search can be correctly managed.

By default, the system 1 is configured to alert the user to the fact that an auto stak suggestion has been made. It automatically switches the currently active stak to the suggested stak, but, as part of the alert, provides the user with an opportunity to undo or reject this suggestion in case it is inappropriate. This feature helps to ensure that users benefit automatically managing their search histories without the need for additional user intervention.

Page Tagging

Regarding online bookmarking services, when a user finds an interesting webpage or other online resource, she can add this resource to a stak directly from the software agent. Specifically, the software agent contains a control that enables the user to add tags that describe the resource in question and by selecting a suitable stak can store this resource, under these tags, in the selected stak; the auto stak selection feature described above can also be used to associate a tagged resource with a stak, so that even if the user does not select a stak manually, the tags they provide can be used in the usual way as the basis for an appropriate stak selection. In this way, users can add new pages and other resources to their staks and benefit from these additions as they search. Tagged pages and resources that have been added by users to a shared stak can appear as promotions in relevant searches, for example. The system 1 does distinguish between URLs that have been added to a stak by dint of a search result selection versus URLs that have been added via tagging and in this way can implement different types of promotion strategies when it comes to dealing with promoting results vs bookmarks.

Stak Search

Many users will create their own personal staks, or staks to share with their friends and colleagues. Some of these staks will be relatively short-lived—they might relate to a short-term project—while others may be relevant and remain active over a much longer time frame. Some of these staks will be configured as private staks, only to be shared on invitation (as discussed previously), while others will be created as public search repositories for others to join and enjoy.

As there is a multitude of staks on a diverse range of topics, of varying levels of quality, a question might be raised as to how users can find staks that might be relevant to their needs. To address this issue, the website 4 provides a stak search feature which operates in a manner that is analogous to normal Web search: the user enters a query and receives a list of ranked results. However, this time the results are not Web pages—they are public staks that have been created by millions of users. Each stak is presented in summary form and includes information such as:

The stak title.

A brief description of the stak subject matter, based on the short description provided by the stak creator at creation time.

The set of tags specified for the stak at creation time.

The user name of the stak creator.

The size of the stak in terms of how many registered subscribers it has, the size of its index etc.

The usage levels of the stak based on how often it is searched and how recently it has been searched.

Summary information about recent or frequent search activities in the form of, for example, a query cloud.

The selection and ranking of staks based on a query will rely on a variety of traditional term-matching techniques; for example, the query terms will be compared to the terms in the stak title, description, tags etc, but also to the terms stored in the stak's index. In addition, information about the staks usage levels will be incorporated to influence the ranking so that staks that are both relevant and popular are ranked ahead of others.

As a result, the user can quickly identify staks that may be relevant to their current needs, and by selecting one of these staks can go on to search its index (either through the website 4 or by adding this stak to their own software agent), or they may want to create their own compound stak by linking to a number of these pre-existing staks.

Stak Recommendations

Within the website 4 the user page view and the stak page view provide additional opportunities to help a user better understand what other staks might be available. In each case, as mentioned earlier, these pages contain a list of recommended staks that are deemed to be relevant.

In the case of the user page the recommended staks are selected based on the current user's own stak history so that new staks are recommended because they are similar or related to existing staks that the user may have created or subscribed to. In theory a wide range of recommendation techniques can be used as the basis for these recommendations. For example, content based techniques can be used to select staks because they share many similar index terms. Alternatively, collaborative filtering style techniques can be used to recommend staks that other users, who share similar staks with the target user, also subscribe to. The user themselves may search suitable staks or like-minded users by way of the network visualizations provided on the HeyStaks site. That is, a visualization is provided that positions the current user in a graph that represents their relationship with other users, where edges are formed when 2 users subscribe to the same search staks, submit similar queries or select the same results. This graph can be used to identify other users whose search knowledge or staks might prove useful to the current user, who can befriend them or simply join their public staks. Similarly, a graph is presented which visualizes the staks themselves and their relationships to each other, with edges formed based on a number of factors, including stak member overlap, query term overlap or co-occurrence of URLs in the stak indexes.

In the case of the stak page view, where the focus is on a single specific stak, recommendations are generated for staks that are similar or related to this specific stak. Once again, a wide range of recommendation techniques can be employed to make these recommendations. These stak recommendation features enable users to discover more staks, based on their own search interests.

The software agent includes code to interpret search engine results. This allows the software agent to: track when a user clicks a search result, and insert promotions into the search result list. This works well, however there is the potential problem that if the search engine changes the formatting of their pages then the software agent code would need to be upgraded. Also, to add a new search engine to the software agent there is a need to upgrade the code and distribute the update to all users and they will have to upgrade their software agent.

To address these potential problems the system includes an automatic update facility, whereby once a software agent is activated it makes a request to the server 2 and downloads any update-codes that are available. Thus, in order to cope with changes to the search result page format, for example, or to add new search engines to the software agent, it can do this automatically by making the update codes available on the server and automatically synchronising them with the software agent. In addition to the maintenance benefits, this also allows the system 1 to permit third-parties to add new search engines or services to the software agent itself. For example, if a third party wishes to offer HeyStaks services over a particular niche search engine then, rather than waiting for the HeyStaks team to add this search engine to the software agent (which they may not if it is too specialised and thus low-priority) the third-party can generate their own update code, which will allow the software agent to interpret their niche search engine's results, and make this available through the system update facility.

In another aspect, when the actions of a user add information to a stak and another user subsequently benefits form a recommendation arising out of this first user's action, then the first user gets a boost to his/her reputation score. In this way the system can calculate a reputation score for each user based on how often their searches (or tags or votes or shares) result in recommendations to other users which are helpful (in the sense that the other users subsequently select these recommendations). Moreover, this reputation score can be used to rank recommendations so that that more reliable (higher reputation users) have a greater recommendation influence.

The invention is not limited to the embodiments described but may be varied in construction and detail.

The invention claimed is:

1. A method for improving a search experience using prior search queries and search results, the method comprising:
   receiving, by a server, from a computing device associated with a user, a search query and a selection of a data set by the user for use in augmenting results provided in response to the search query, wherein the data set is associated with a topic relevant to the search query and the data set comprises (i) prior search queries and prior search results associated with a plurality of members of the data set, the plurality of members comprising the user and (ii) a rank for each of the prior search results based at least in part on a frequency members of the data set prior set selected, tagged, or applied vote quantifiers to the prior search results;
   identifying, by the server, one or more search results to provide to the computing device associated with the user in response to the search query based at least in part on the data set;
   identifying, by the server, using the data set, at least one of the one or more search results to promote among search results provided to the computing device associated with the user in response to the search query, thereby improving the search experience by reusing at least one prior search query and prior search result from the data set;
   providing, by the server, the one or more search results to the computing device associated with the user, wherein the one or more search results provided to the computing device comprising the at least one promoted search result;
   storing, by the server, in a database, the one or more search results and the search query and associating the search results and search query with the data set such that the search results and the search query are used to improve search results in response to a future search query associated with the data set;
   receiving, by the server, from the computing device associated with the user, an identifier to apply to the search results provided to the user to form a new data set and an identification of a plurality of users to associate with the new data set, wherein receiving the identification of the plurality of users to associate with the new data set comprises communicating with a social network server; and
   receiving, by the server, from the computing device associated with the user, permissions on the new data set at a global, individual, or role-based level, to control whether different searching actions will result in the data set being updated.

2. The method of claim 1, wherein the prior search results in the data set comprises Web page results.

3. The method of claim 1, comprising, sending, by the server, via the social network server, invitations to the plurality of identified users to become members of new data set.

4. The method of claim 1, comprising linking, by the server, the data set with a second data set to form a compound data set comprising the data set and the second data set.

5. The method of claim 1, further comprising:
   receiving, by the server, a request to create a new data set,
   receiving, by the server, a request to share the new data set with other users.

6. The method of claim 5, the method comprising
   augmenting, by the server the results of the response with additional results taken from the data set that is identified as being relevant to the search query.

7. The method of claim 5, wherein the one or more search results provided to the computing device associated with the user are ranked based at least in part using reputation information derived from historical actions of data set members.

8. The method of claim 7, wherein a user's reputation score is calculated based on the extent to which their search actions within a particular data set assist other users to locate relevant information.

9. The method of claim 5, the method comprising
   exporting, by the server, data set content such that the data set content is arranged to be imported into external data sources or stored for backup purposes.

10. The method of claim 5, the method comprising
    caching, by the server, the one or more search results provided to the computing device associated with the user to improve response times.

11. The method of claim 1, wherein the method comprises at least one of:
    providing by the server, access to data feeds concerning recent activity in a user's data sets,
    providing by the server, tools for filtering recent activity data under a category, a set list, showing data sets that the user is a member of and giving summary information on each, and
    providing, by the server, one or more recommendations of one or more data sets the user may join.

12. The method of claim 1, comprising receiving, by the server, from the computing device associated with the user, at least one of identification of who can access the data set and identification of whether searching actions by member of the data set will result in updating the data set.

13. The method of claim 1, comprising:
    receiving, by the server, search result lists comprising search results from an additional search engine; and updating, by the server, the data set to include at least a portion of the search results on the search result lists.

14. The method of claim 1, wherein the data set comprises results from different search engines.

15. The method of claim 1, comprising: providing users with lists of one or more data sets of which the user of the computing device associated with the user is currently members.

16. The method of claim 1, comprising receiving, by the server, a request to share the data set directly with other users or with entire communities of which the user is a member.

* * * * *